(12) United States Patent
Day et al.

(10) Patent No.: US 9,486,101 B2
(45) Date of Patent: Nov. 8, 2016

(54) MODULAR APPLIANCE

(71) Applicant: Sunbeam Products, Inc., Boca Raton, FL (US)

(72) Inventors: Adam Day, Boynton Beach, FL (US); Phetsouvanh Kounlavong, Lake Worth, FL (US); Daniel Juhyung Lee, Monticello, WI (US); Dov Glucksman, Danvers, MA (US); Gary P. McGonagle, Lynn, MA (US); Joseph C. Spencer, Jr., Purvis, MS (US); George T. Hardin, Jr., Hattiesburg, MS (US); Laura Nickerson, Fitchburg, MA (US)

(73) Assignee: Sunbeam Products, Inc., Boca Raton, FL (US)

( * ) Notice: Subject to any disclaimer, the term of this patent is extended or adjusted under 35 U.S.C. 154(b) by 574 days.

(21) Appl. No.: 14/000,256

(22) PCT Filed: Mar. 26, 2013

(86) PCT No.: PCT/US2013/033793
§ 371 (c)(1),
(2) Date: Aug. 19, 2013

(87) PCT Pub. No.: WO2013/148622
PCT Pub. Date: Oct. 3, 2013

(65) Prior Publication Data
US 2014/0062216 A1 Mar. 6, 2014

Related U.S. Application Data

(60) Provisional application No. 61/616,120, filed on Mar. 27, 2012, provisional application No. 61/697,609, filed on Sep. 6, 2012.

(51) Int. Cl.
*H01R 25/00* (2006.01)
*A47J 27/00* (2006.01)
*H01F 38/14* (2006.01)
*H01R 13/60* (2006.01)
(Continued)

(52) U.S. Cl.
CPC ............... *A47J 27/004* (2013.01); *A47J 36/00* (2013.01); *H01F 38/14* (2013.01); *H01R 13/447* (2013.01); *H01R 13/60* (2013.01); *H01R 13/6275* (2013.01); *H05B 1/0261* (2013.01); *A47J 2201/00* (2013.01); *H01R 9/2408* (2013.01); *H01R 13/20* (2013.01); *H01R 33/94* (2013.01)

(58) Field of Classification Search
USPC ......................................... 439/638, 501, 528
See application file for complete search history.

(56) References Cited

U.S. PATENT DOCUMENTS 5,547,393 A * 8/1996 Jansen .................... A45D 20/12
132/233

(Continued)

*Primary Examiner* — Tho D Ta
(74) *Attorney, Agent, or Firm* — Michael J. Corrigan

(57) ABSTRACT

Appliances comprising a base unit and a plug connector coupled to the base unit. The plug connector is configured to electrically couple the appliance to a first socket connector of an electrical receptacle. A channel is formed on or in a first sidewall of the base unit. The plug connector is disposed in the channel when in an engaged position. A defines a channel wall of the channel. The lever is configured to facilitate a transition of the plug connector between the engaged position and a disengaged position. The lever engages the plug connector when in the engaged position and does not engage the plug connector when in the disengaged position.

17 Claims, 13 Drawing Sheets

(51) Int. Cl.
*H01R 13/627* (2006.01)
*A47J 36/00* (2006.01)
*H01R 13/447* (2006.01)
*H05B 1/02* (2006.01)
*H01R 9/24* (2006.01)
*H01R 13/20* (2006.01)
*H01R 33/94* (2006.01)

(56) References Cited

U.S. PATENT DOCUMENTS

| | | | |
|---|---|---|---|
| 5,857,263 A * | 1/1999 | Chan | A45D 20/12 |
| | | | 34/97 |
| 6,843,667 B2 * | 1/2005 | Khoury | A47J 27/2105 |
| | | | 219/432 |
| 6,860,764 B2 * | 3/2005 | Khoury | A47J 27/2105 |
| | | | 439/638 |
| 2002/0037668 A1 * | 3/2002 | Tseng | H01R 13/20 |
| | | | 439/660 |
| 2004/0129522 A1 | 7/2004 | Skowronski | |
| 2004/0149729 A1 | 8/2004 | Kressmann | |
| 2010/0089246 A1 | 4/2010 | Yang | |
| 2011/0006054 A1 | 1/2011 | Garcia | |
| 2011/0203570 A1 | 8/2011 | Popeil et al. | |
| 2014/0361001 A1 * | 12/2014 | Day | H01F 38/14 |
| | | | 219/428 |

* cited by examiner

MODULAR APPLIANCE

STATEMENT OF THE TECHNICAL FIELD

The inventive arrangements relate to modular appliances. More particularly, the inventive arrangements concern systems and methods for enabling two or more appliances to be selectively interconnected together.

DESCRIPTION OF THE RELATED ART

There are many types of appliances known in the art. One such appliance is a slow cooker. A slow cooker is generally a countertop electrical cooking appliance that is used for unattended cooking. The slow cooker generally consists of a lidded cooking container surrounded by a housing including a heating element. The cooking container is typically made of stoneware for optimum slow cooking. A power cable extends from the housing which has a conventional mains plug attached to its distal end for connection to a wall outlet. The slow cooker is typically absent of a means for mechanically, and/or electrically interconnecting it with another cooking appliance.

SUMMARY OF THE INVENTION

The invention concerns first appliances (e.g., cooking appliances such as a slow cooker). The first appliances each comprise a base unit and a plug connector coupled thereto. The plug connector is configured to electrically couple the first appliance to a first socket connector of an electrical receptacle (e.g., a wall outlet or an outlet of another appliance). The plug connector can have an aperture formed therein that is configured to receive a guide protruding out and away from the first socket connector. The aperture and guide facilitate the alignment and mechanical coupling of the connectors. Also, the aperture and guide collectively provide a means for ensuring that plug connectors of other devices may not be electrically coupled to the first socket connector.

A channel is formed on or in a first sidewall of the base unit in which the plug connector is disposed when in an engaged position. A lever defines a channel wall of the channel. The lever is configured to facilitate a transition of the first plug connector between an engaged position and a disengaged position. The lever engages the plug connector when in the engaged position, and does not engage the plug connector when in the disengaged position. A retractable cable coupled to the plug connecter may be removed from an internal chamber of the base unit when the first plug connector is in its disengaged position. In some scenarios, the cable can be retracted manually or electrically.

In some scenarios, the lever and a plurality of channel walls of the channel collectively facilitate an alignment of the first plug connector and the first socket connector when being electrically coupled together. Additionally or alternatively, the lever and the channel walls collectively facilitate a mechanical coupling of the base unit to the electrical receptacle.

In the same or other scenarios, the appliance further comprises a second socket connector. The second socket connector is generally configured to electrically couple the first appliance to a second plug connector of another appliance. The second socket connector may be disposed on a first side of the base unit which is opposed from a second side of the base unit on which the first plug connector is disposed. Also, the first plug connector and the second socket connector may be aligned with each other.

The invention also concerns second appliances. The second appliances each comprise a base unit, a first inductive coupler and a retractable plug-cable assembly. The first inductive coupler is configured to inductively couple the second appliance to a first adjacent appliance. The retractable plug-cable assembly is configured to electrically couple the second appliance to an electrical receptacle (e.g., a wall outlet or an outlet of another appliance).

In some scenarios, the second appliance supplies power to the first adjacent appliance from the electrical receptacle via the first inductive coupler. In other scenarios, the second appliance is exclusively supplied power from the first adjacent appliance via the first inductive coupler. In yet other scenarios, the appliance is exclusively supplied power from the electrical receptacle during a first period of time, and supplied power from the first adjacent appliance during a second period of time.

A second inductive coupler may be provided for inductively coupling the second appliance to a second adjacent appliance. The second inductive coupler may be disposed on a first side of the base unit opposed from a second side of the base unit on which the first inductive coupler is disposed. The first inductive coupler also may be aligned horizontally and vertically with the second inductive coupler.

A channel may also be provided. The channel can be formed on or in a first sidewall of the base unit in which the plug connector of the retractable plug-cable assembly is disposed when in an engaged position. A channel wall of the channel, is defined by a lever. The lever is configured to facilitate a transition of the plug connector between the engaged position and a disengaged position. The lever engages the plug connector when in the engaged position and does not engage the plug connector when in the disengaged position.

The invention further concerns third appliances. The third appliances each comprise a base unit, a plate, and a first inductive coupler. The plate is pivotally coupled to the base unit such that the plate is transitionable from a closed position to an open position. The first inductive coupler is coupled to the plate. The first inductive coupler is configured to inductively couple the appliance to a first adjacent appliance. The first inductive coupler is disposed within a chamber of the base unit when the plate is in the closed position, and exposed when the plate is in the open position.

The third appliance may also comprise an electrical coupler configured to electrically couple it to a second adjacent appliance. The electrical coupler comprises an electrical connector or a second inductive coupler. The third appliance may further comprise a retractable plug-cable assembly configured to electrically couple it to an electrical receptacle. Accordingly, the third appliance can supply power from the electrical receptacle to the first adjacent appliance via the first inductive coupler. The third appliance can also be supplied power from the first adjacent appliance via the first inductive coupler.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
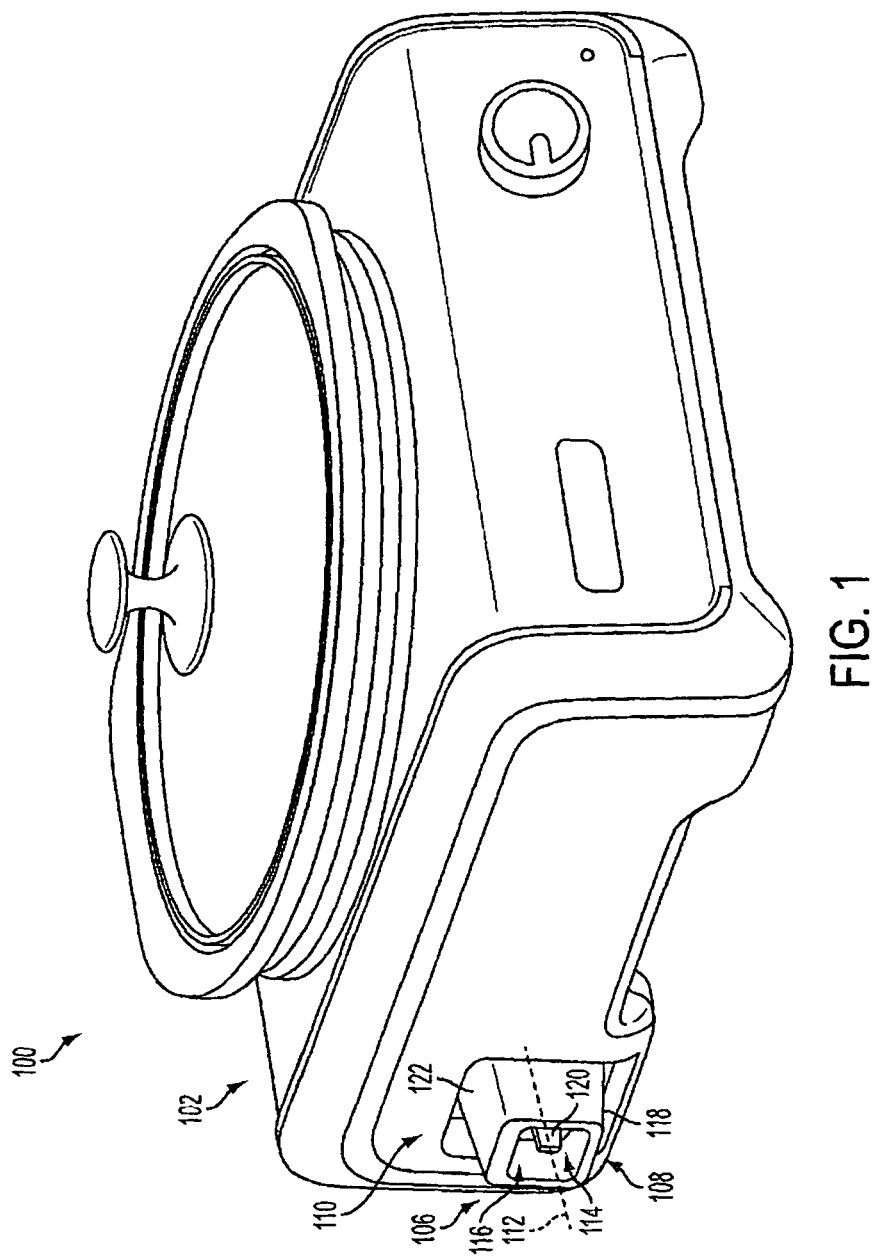
FIG. 1 is a front-left perspective view of a first exemplary appliance.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Referring now to FIG. 1, there is provided a front-left perspective view of a first exemplary appliance 100. Although the appliance 100 is shown in FIG. 1 as comprising a slow cooker, the present invention is not limited in this regard. In some scenarios, the appliance 100 may comprise a toaster, a water dispenser, a waffle iron, a kettle, or any other cooking appliance. Alternatively or additionally, the appliance 100 may have a function which is other than for the preparation of food and/or drinks. Examples of such appliances include, but are not limited to, televisions, radios, clocks and/or coolers.

The appliance 100 has a compact design such that it can be placed on a countertop when in use and stored in a cabinet when not in use. The appliance 100 is also configured for unattended cooking. As such, the appliance 100 includes internal electrical components (not shown) in a base unit 102. Such electrical components of a slow cooker are well known in the art, and therefore will not be described herein. For example, similar slow cooker appliances having similar electronic components are disclosed and illustrated in U.S. Pat. Nos. 6,740,855, 6,740,855, 7,312,425 and 6,587,739, all of which are incorporated by reference in their entirety as if fully rewritten herein. However, the manner in which these electrical components are supplied power will be discussed in detail below in relation to FIGS. 1-5. A cooking container 130 is disposed in a recess (not shown) in the base unit 102. The cooking container 130 may be comprised of a stoneware, glazed ceramic, porcelain, metal or other suitable material known to one of ordinary skill in the art. The cooking container 130 may be round, oval, oblong or other shape and any capacity such as 1 quart, 2.5 quart, 3.5 quart or other capacity. In the illustrated embodiment, the base unit 130 has one cooking container disposed in the recess (not shown). It should be understood that there may be more than one cooking containers 130 disposed in a recess in the base unit 102 (see FIG. 3) such as two or more cooking containers 130 of the same or other shape and of the same or different volume. A lid 135 may be provided to cover the cooking container 130.

Figure 2:
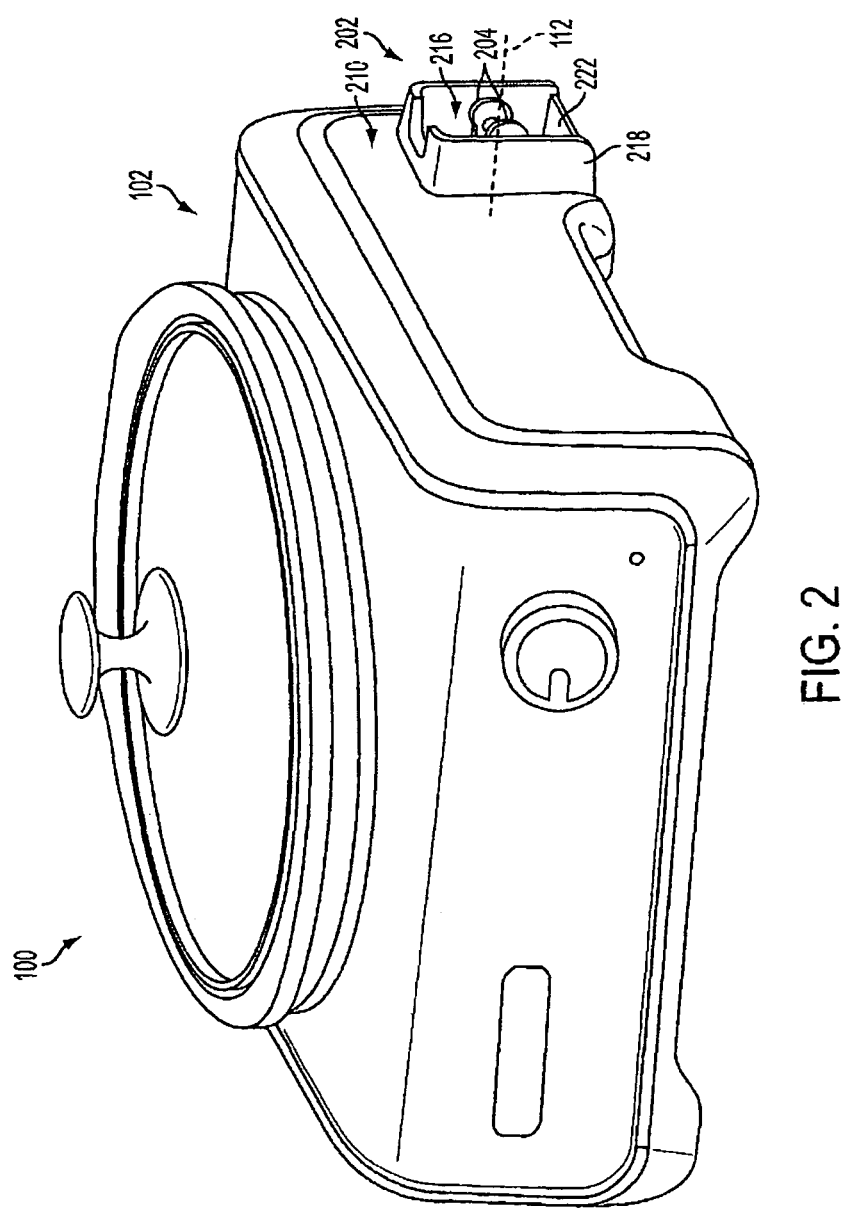
FIG. 2 is a front-right perspective view of the appliance shown in FIG. 1.
Figure 4:
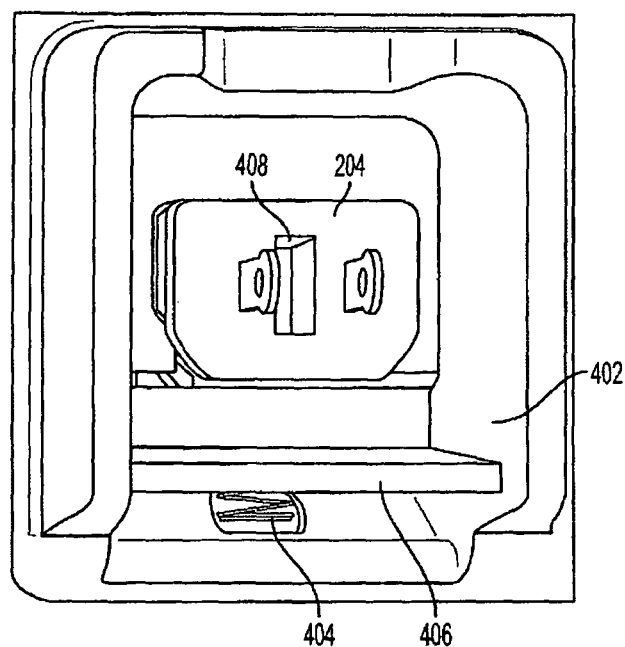
FIG. 4 is a perspective view of the mains plug assembly of the appliance shown in FIG. 1.
Figure 5:
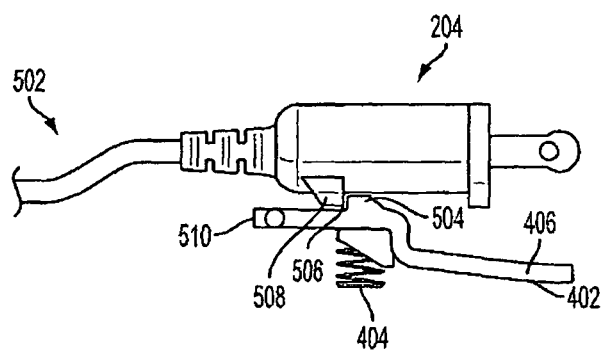
FIG. 5 is a schematic illustration that is useful for understanding a lever assembly of the appliance shown in FIG. 1.

As shown in FIGS. 1-2, the appliance 100 includes a base unit 102 which houses the electrical components (not shown) and a portion of a Power Supply Assembly ("PSA") 106. The PSA 106 includes a socket assembly 108 and a plug assembly 202. The socket assembly 108 comprises a socket connector 114 disposed within a channel 116 formed by a protruding wall 118. Similarly, the plug assembly 202 comprises a plug connector 204 disposed within a channel 216 formed by a protruding wall 218. The present invention is not limited in this regard. For example, in other scenarios, the channels 116, 216 can alternatively be formed within the base unit 102. More particularly, the channels 116, 216 can be formed within respective sidewalls 110, 210 of the base unit 102. Accordingly, the socket assembly 108 and plug assembly 202 may be at least partially recessed within the base unit 102. Also, the socket connector 114 and plug connector 204 can have a housing with any shape (e.g., a six-sided shape as shown in FIG. 4 or a triangular shape).

Figure 3:
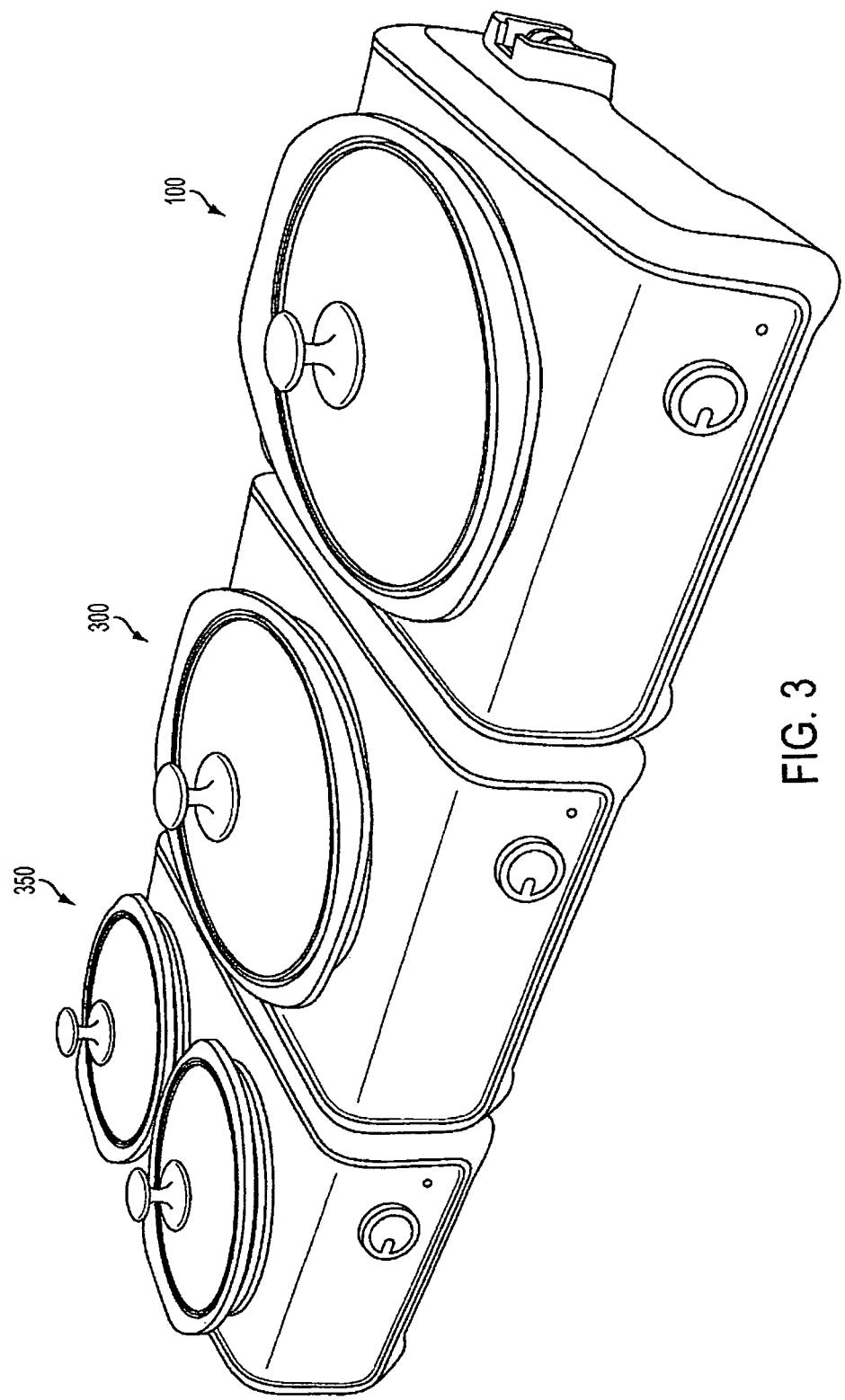
FIG. 3 is a perspective view of the appliance shown in FIG. 1 electrically connected to two other appliances.

The plug connector 204 is designed to mate with a socket connector 114 of another appliance (e.g., appliance 300 or 350 of FIG. 3). In some scenarios, the socket connector 114 comprises a rigid guide 120 for facilitating a proper alignment of a plug connector 204 of another appliance (e.g., appliance 300 or 350 of FIG. 3) therewith. Accordingly, the plug connector 204 comprises an aperture (e.g., aperture 408 of FIG. 4) sized and shaped to receive the rigid guide 120 of another appliance (e.g., appliance 300 or 350 of FIG. 3). The rigid guide 120 also facilitates the retention of a plug connector 204 of another appliance (e.g., appliance 300 or 350 of FIG. 3) in the socket, connector 114 of appliance 100 during use thereof. The rigid guide 120 can have any shape, such as a rectangular shape as shown in FIG. 1. Likewise, the corresponding aperture 408 formed in the plug connector 204 can have any shape, such as a rectangular shape as shown in FIG. 4.

Similar to the rigid guide 120, the walls 118, 218 are designed to ensure proper alignment of mating connectors and the retention of a mated arrangement of said connectors during use thereof. Accordingly, in some scenarios, the wall 118 has an angled exterior surface 122 for frictionally, engaging an angled interior surface 222 of the wall 218. This, frictional engagement between the walls 118, 218 ensures that two interconnected appliances (e.g., appliances 100 and 300 as shown in FIG. 3) will not unintentionally be separated from each other when in use.

As shown in FIG. 1, the socket assembly 108 is disposed on a first sidewall 110 of the base unit 102. In contrast, the plug assembly 202 is disposed on a second sidewall 210 opposed from the first sidewall 110 of the base unit 102. Notably, the assemblies 108, 202 are located on the sidewalls 110, 210 such that they both have the same center axis 112, and therefore are horizontally and vertically aligned with each other. This alignment of the assemblies 108, 202 ensures that the appliance 100 can be mechanically and electrically interconnected with at least one other appliance 300, 350, as shown in FIG. 3. The other appliances 300, 350 can be the same as, similar to or different than the appliance 100. If the other appliance 350 is different than the appliance 100, then all that is needed to establish said interconnection is a socket or plug configured for mating with a corresponding component 114, 204 of the assembly 100. Also, in this scenario and other scenarios, the assemblies 108, 202 may not be arranged so as to be horizontally and vertically aligned with each other. Furthermore, a light emitting diode can be provided to indicate (a) when at least two appliances are mechanically and/or electrically interconnected, and/or (b) when an appliance is being supplied power from an adjacent appliance.

In the interconnected arrangement of FIG. 3, the appliance 100 is directly connected to a first appliance 300 and indirectly connected to a second appliance 350 via the first appliance 200. The present invention is not limited in this regard. In other scenarios, the appliance 100 may reside in between two appliances so as to be directly coupled to both adjacent appliances. The appliance 100 can also be indirectly coupled to any number of other appliances.

In the scenario of FIG. 3, the appliance 100 is directly coupled to a single other appliance 300. As such, the appliance 100 may be selected as a master unit, while the other appliances 300, 350 are selected as slave units. Alternatively, the appliance 350 can be selected as the master unit, while the appliances 100, 300 are selected as the slave units. If the appliance 100 is selected as the master unit, then the slave units 300, 350 are supplied power from an electrical receptacle (e.g., a wall outlet) via the master unit 100. Accordingly, a plug connector 204 of the master unit 100 is coupled to a retractable cable 502 shown in FIG. 5. Retractable cables are well known in the art, and therefore will not be described herein. Any known or to be known retractable cable can be used herein without limitation. Still, it should be understood that the cable 502 can be stored in and removed from a chamber (not shown) formed within the base unit 102. The removal of the cable 502 from the chamber (not shown) is facilitated by a lever 402. The cable 502 can be removed from or retracted into the chamber via manual or automatic operations.

The lever 402 is generally designed to engage the plug connector 204 when it is in its engaged position shown in FIGS. 1-4. In this regard, the lever 402 comprises a resilient component 404 and a rigid component 406. The resilient component 404 can include, but is not limited to, a spring. The resilient component 404 enables the depression of the rigid component 406 such that the plug connector 204 can be disengaged therefrom. The resilient component 404 also ensures that the rigid component 406 returns to its un-depressed position after being released.

The rigid component 406 comprises an engagement structure 504 for engaging the plug connector 204 so as to retain at least a portion thereof within the internal chamber (not shown) of the base unit 102. In this regard, the engagement structure 504 has an engagement surface 506 sized and shaped to mechanically and frictionally engage a surface 508 of the plug connector 204. The rigid component 406 also comprises posts 510 for securely and pivotally coupling the rigid component 406 to the base unit 102.

Notably, in the scenario of FIG. 3, the lever 402 has at least the following purpose: (1) facilitate the retention of the cable 502 in the internal chamber of the base unit 102 when the appliance 100 is not in use; and (2) facilitate the removal of the cable 502 from the internal chamber when the appliance 100 is in use. However, in other scenarios where the appliance 100 constitutes a slave unit, the lever 402 can have at least the following purposes: (1) facilitate a retention of the cable 502 in the internal chamber of the base unit 102; (2) facilitate the alignment of the plug connector 204 and a mating socket connector of an adjacent appliance; and (3) facilitate a mechanical coupling of the mating socket assembly of the adjacent appliance and the plug assembly 202 of the appliance 100. Notably, in both scenarios, the lever 402 has multiple purposes.

Figure 6:
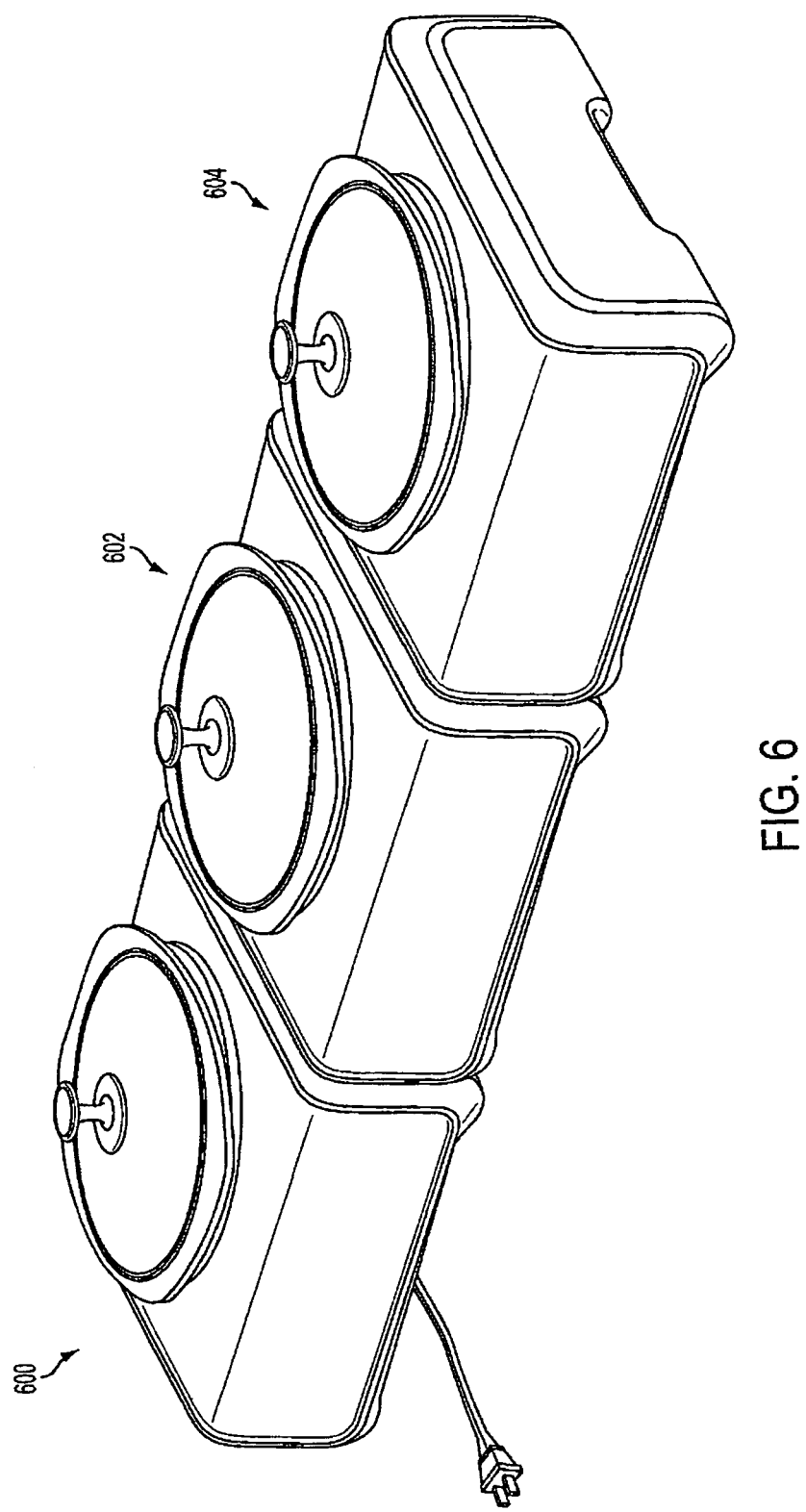
FIG. 6 is a perspective view of a second exemplary appliance electrically coupled to other appliances.

Referring now to FIG. 6, there is provided a perspective view of other exemplary appliances 600, 602, 604. Similar to appliance 100 described above, each of the appliances 600, 602, 604 is designed to be electrically interconnected with at least one other appliance and/or an electrical receptacle (e.g., a wall outlet). However, the electrical interconnection may or may not be achieved in the same manner as described above in relation to FIGS. 1-5. In this regard, at least one electrical interconnection may be achieved via electrical connector coupling and/or inductive coupling. In the electrical interconnection scenario, a plug connector of an appliance 600, 602, 604 may be coupled with a socket connector of another appliance, such as appliance 100. In the inductive coupling scenario, the inductive coupling is provided by horizontally and vertically aligned inductive couplers of two adjacent appliances 600 and 602 or 602 and 604. Inductive couplers are well known in the art, and therefore will not be described herein. Any known or to be known inductive coupler can be used with the present invention without limitation.

Figure 7:
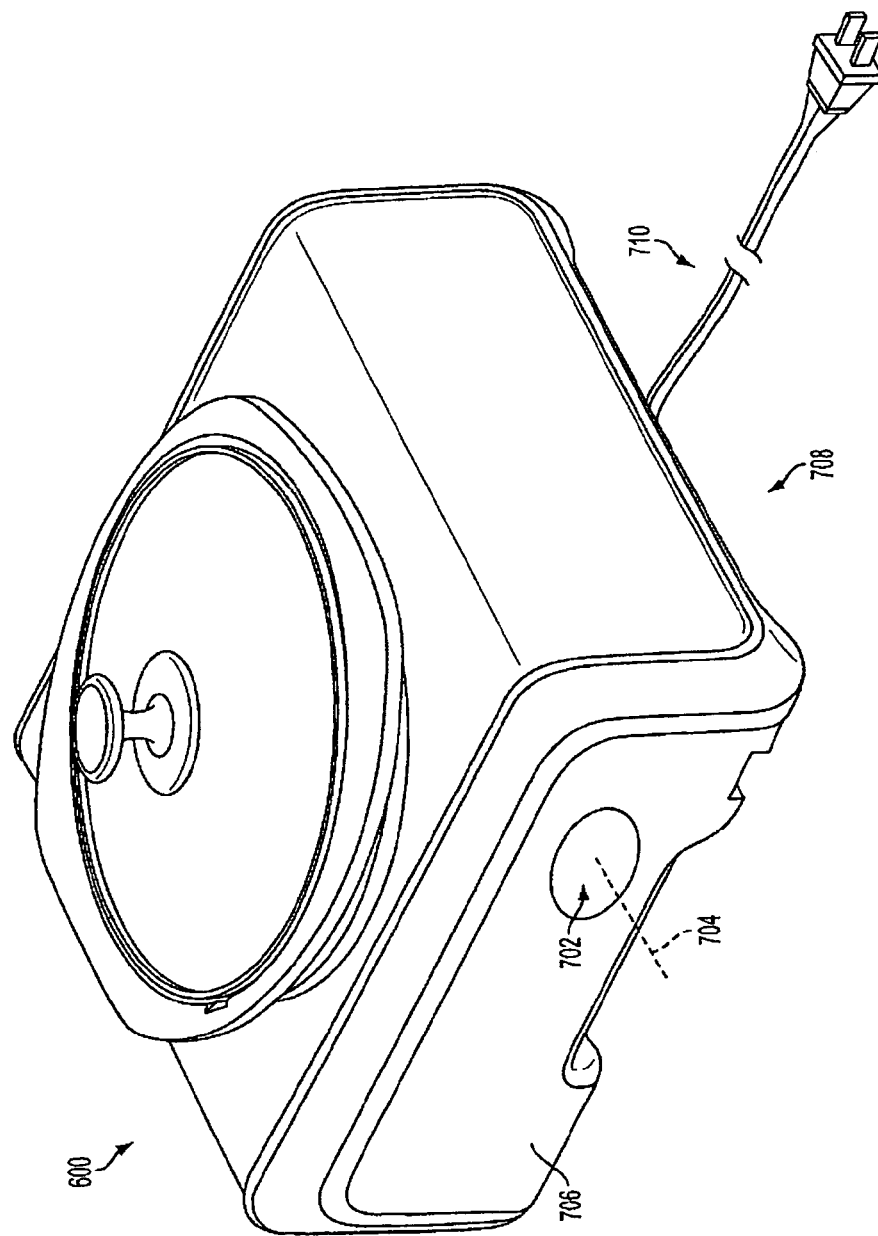
FIG. 7 is a front-left perspective view of the second exemplary appliance shown in FIG. 6.
Figure 8:
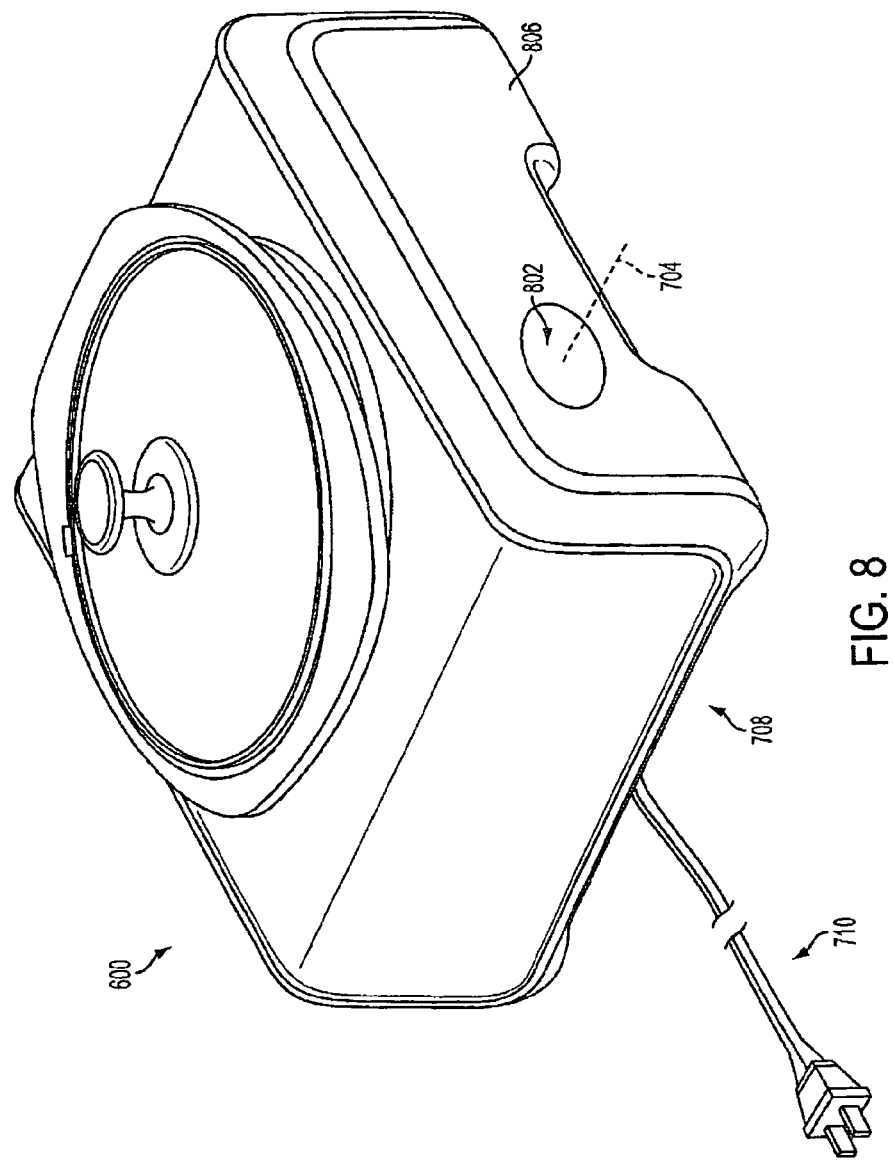
FIG. 8 is a front-right perspective view of the second exemplary appliance shown in FIG. 6.

Perspective views of appliance 600 are provided in FIGS. 7-8. Appliances 602, 604 are the same as or similar to appliance 600. As such, the discussion provided below in relation to appliance 600 is sufficient for understanding appliances 602, 604. As shown in FIGS. 7-8, appliance 600 comprises a slow cooker. The present invention is not limited in this regard. The appliance 600 can include any type of cooking apparatus, such as a toaster or a kettle. Alternatively or additionally, appliance 600 may have a function which is other than for the preparation of food and/or drinks. Examples of such appliances include, but are not limited to, televisions, radios, clocks and/or coolers.

Notably, appliance 600 has two internal inductive coupling elements. A first inductive coupling element (not shown) is disposed adjacent to portion 702 of appliance 600. A second inductive coupling element (not shown) is disposed adjacent to portion 802 of appliance 600. The first and second inductive coupling elements are arranged so as to have the same center axis 704. As a result, each inductive coupling element can be properly horizontally and vertically aligned with a corresponding inductive coupling element of an adjacent appliance (e.g., appliance 602 of FIG. 6). The present invention is not limited in this regard. In other scenarios, the two inductive coupling elements may not have the same center axis, or be aligned with one another.

In order to facilitate the inductive coupling of two adjacent appliances, a plug assembly 710 may extend from a sidewall 708 of the appliance 600 which is different than the sidewalls 706, 806 on which portions 702, 802 exist. As shown in FIGS. 7-8, the sidewall 708 is a bottom sidewall of the apparatus 600. The present invention is not limited in this regard. The plug assembly 710 may extend from any sidewall of the appliance. In some scenarios, the plug assembly 710 can extend from any sidewall except for sidewalls 706, 806. However, in other scenarios, the plug assembly 710 may extend from a sidewall 706 or 806 in a manner that will not cause an interference with inductive Coupling between two adjacent units.

The plug assembly 710 is configured to electrically connect the appliance 600 to an electrical receptacle (e.g., a wall outlet or a socket connector of an adjacent appliance). Plug assemblies of this type are well known in the art, and therefore will not be described herein. Any known or to be known plug assembly can be used without limitation. In some scenarios, the plug assembly comprises a retractable cable with a plug connector attached to a distal end thereof. The plug assembly 710 may be the same as, similar to or different than that discussed above in relation to FIGS. 1-5. As such, the cable storage in and removal from a chamber (not shown) formed within the base unit can be facilitated by a lever (e.g., lever 406 of FIG. 4) defining at least one sidewall of a channel in which the plug connector is disposed when in its engaged position.

Notably, the plug assembly 710 is arranged such that it does not interfere with an inductive coupling between appliance 600 and an adjacent appliance (e.g., appliance 602 of FIG. 6). Also, the plug assembly 710 and inductive couplers (not shown) allow appliance 600 to selectively act as a master unit or a slave unit. The selection can be achieved using a manually or automatically controlled switch. For example, a switch can be provided in each appliance which is configured to automatically change an operational mode of the appliance from a master unit mode to a slave unit mode based on various parameters, and vice versa. For example, an operational mode of an appliance 600 can be automatically transitioned from a slave unit mode to a master unit mode in response to the depression of a lever, the removal of the cable from the chamber formed within the base unit, the coupling of the plug connector to a wall outlet, and/or a detected distance between the appliance and at least one adjacent appliance. In contrast, the operational mode of the appliance 600 can be automatically transitioned from the master unit mode to the slave unit mode in response to the retraction of the cable, an engagement of the plug connector and lever, and/or a detected distance between the appliance and at least one adjacent appliance. Such a switch arrangement ensures that each appliance will only receive power from a single source during any given period of time.

When acting as a slave unit, the appliance 600 is supplied power from an adjacent appliance via inductive coupling. In contrast, when acting as a master unit, the appliance 600 is supplied power via an electrical receptacle (e.g., a wall outlet). Also, the appliance 600 supplies power to any adjacent appliance (e.g., appliance 602 of FIG. 6). The adjacent appliance (e.g., appliance 602 of FIG. 6) may facilitate the indirect supply of power from appliance 600 to other appliances (e.g., appliance 604 of FIG. 6), which are not directly adjacent to appliance 600, via inductive coupling. In some scenarios, the indirect power supply may alternatively or additionally be achieved via electrical connector coupling.

Although the inductive coupling elements of appliance 600 are shown and described as being positioned therein such that the shape of a housing is not affected thereby, embodiments of the present invention are not limited in that regard. For example, in some scenarios, the inductive coupling elements may be disposed within channels formed by protruding walls that are similar to or the same as walls 118, 218 described above in relation to FIGS. 1-2. In these scenarios, the inductive coupling elements would replace the socket connector 114 and plug connector 204 of appliance 100.

Figure 9:
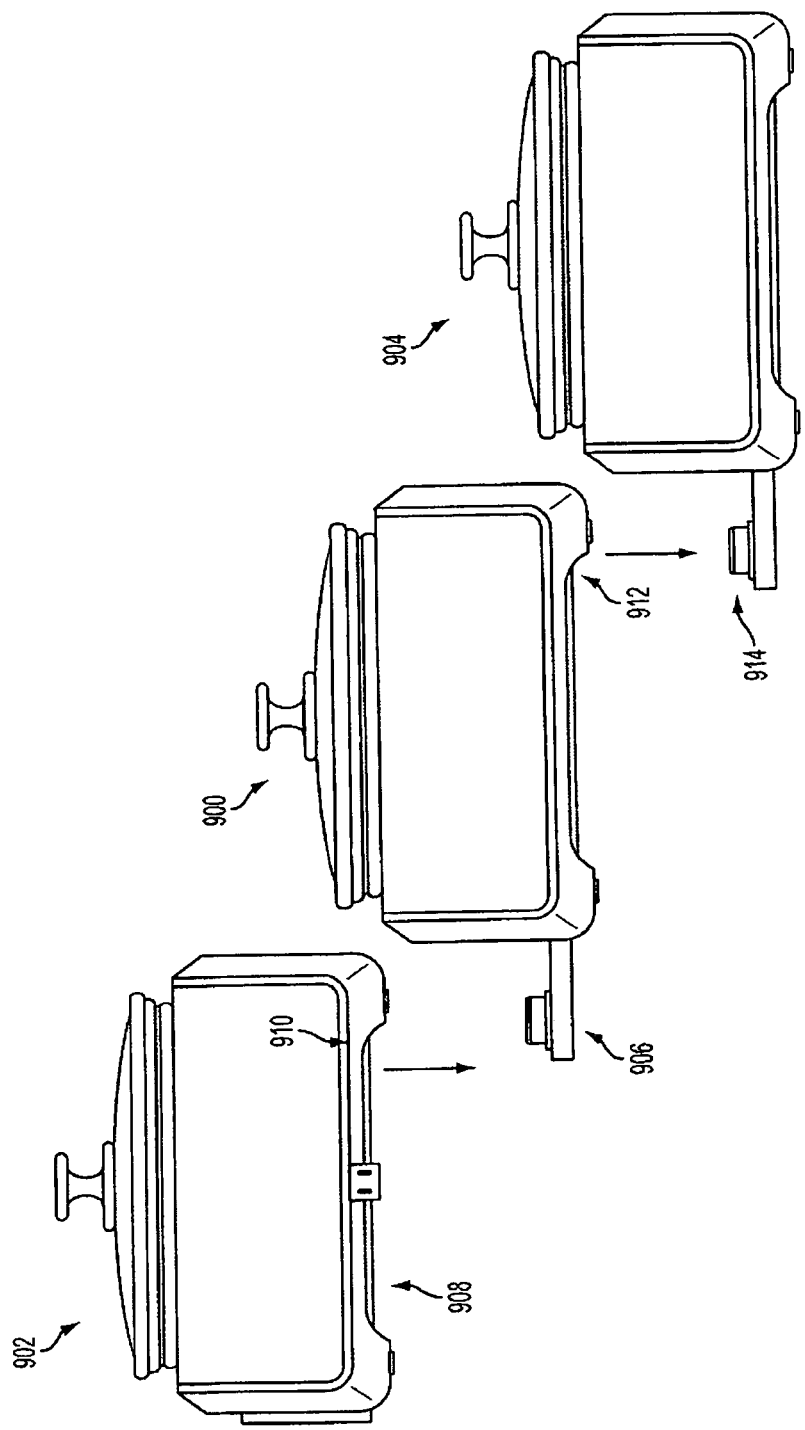
FIG. 9 is a schematic illustration that is useful for understanding how a third exemplary appliance can be electrically coupled to other appliances.

Referring now to FIG. 9, there is provided a perspective view of other exemplary appliances 900, 902, 904. Each appliance 900, 902, 904 is similar to appliance 100 and/or 600, albeit different in some ways. For example, each appliance 900, 902, 904 is configured to be electrically interconnected with at least one other appliance. This interconnection may be achieved via an inductive coupling or an electrical connector coupling. The electrical interconnection is achieved via a Flip-Out Interconnection Assembly ("FOIA") 906.

The FOIA 906 will now be described in detail in relation to FIGS. 10-11 and appliance 900. The FOIAs of appliances 902, 904 are the same as or similar to that of appliance 900. As such, the following discussion of FOIA 906 is sufficient for understanding the FOIAs of appliances 902, 904.

Figure 10:
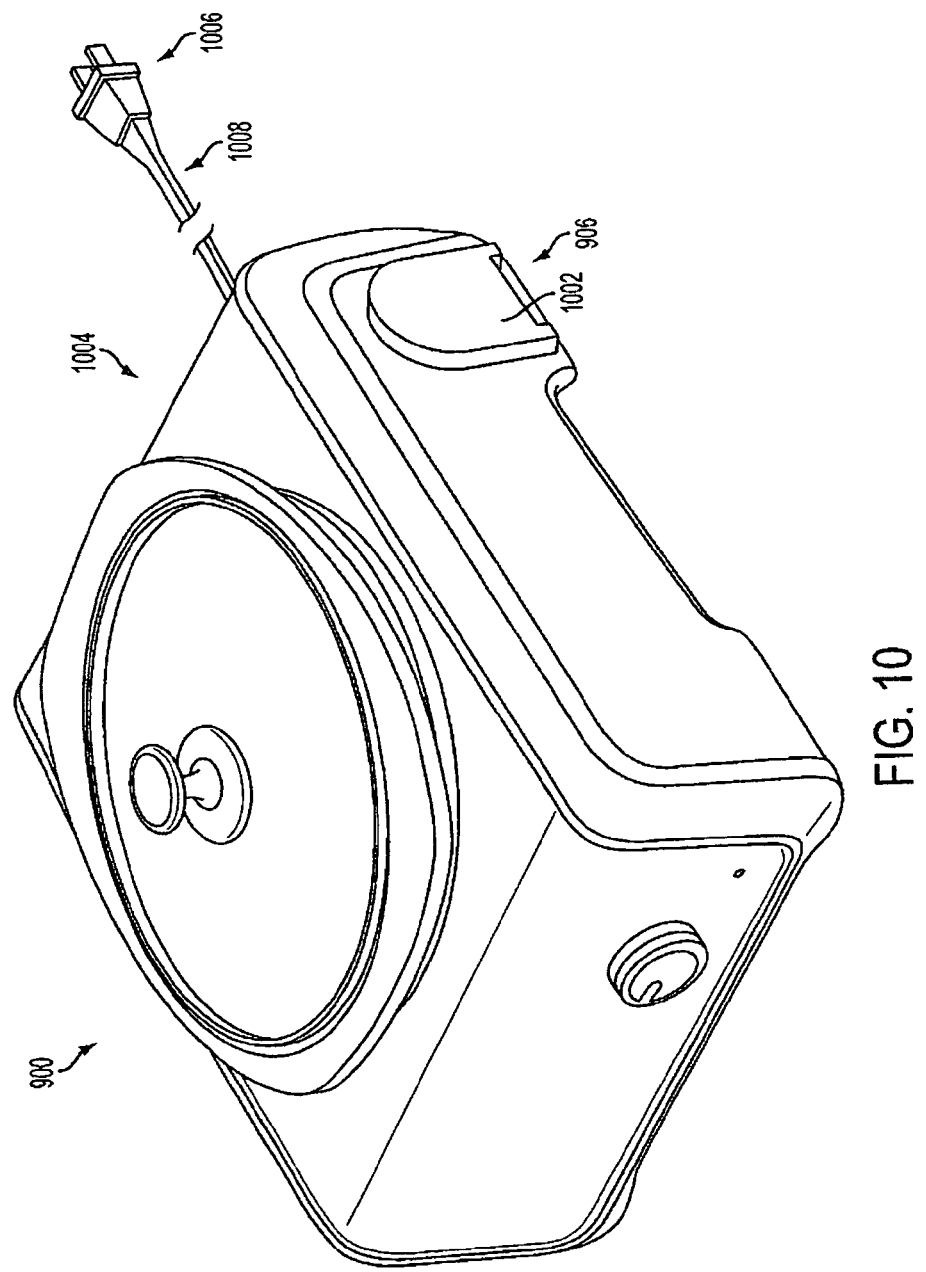
FIG. 10 is a front-left perspective view of the third exemplary appliance shown in FIG. 9.
Figure 11:
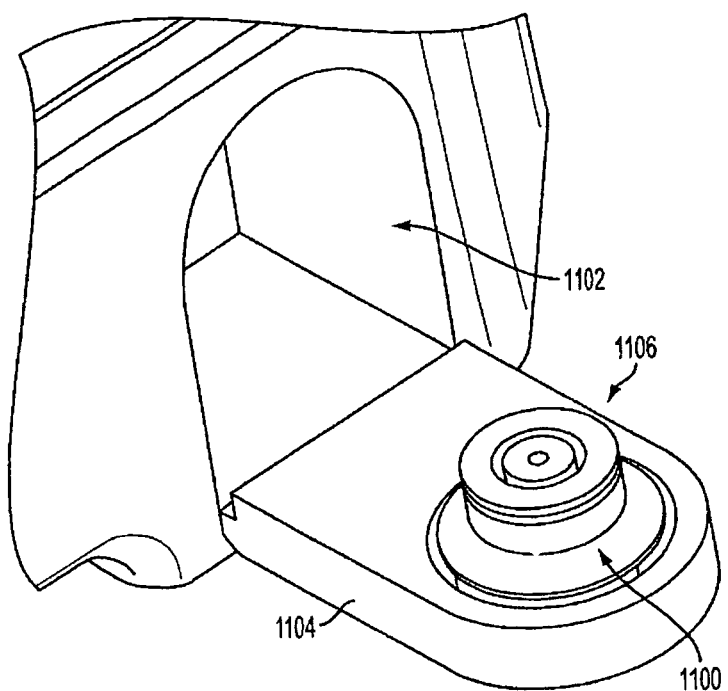
FIG. 11 is a schematic illustration that is useful for understanding a fold out connector of the apparatus of FIG. 9.

As shown in FIGS. 10-11, the FOIA 906 comprises a plate 1002 pivotally coupled to a base unit 1004 of the appliance 900. Means for pivotally coupling a plate to another structure are well known in the art. Any known or to be known pivotal coupling means can be used herein without limitation. For example, the pivotal coupling means may comprise two posts (not shown) protruding from two opposing side surfaces 1104, 1106 of the plate 1002. The posts are sized and shaped to fit within respective apertures (not shown) formed in the base unit 1004.

The pivotal coupling allows the plate 1002 to be transitioned from its closed position shown in FIG. 10 to its opened position shown in FIG. 11. In the closed position, an electrical coupler 1100 is disposed in a chamber 1102 of the base unit 1004. In the open position, the electrical coupler 1100 is exposed such that it can be coupled to a corresponding electrical coupler 910 of another appliance 902. The corresponding electrical coupler 910 is disposed on a bottom 908 of the other appliance 902 so as to be positioned for electrical coupling with the electrical coupler 1100 of appliance 900. Appliance 900 also comprises a corresponding electrical coupler 912 for mating with an electrical coupler 914 of another appliance 904.

The electrical coupler 1100 and the corresponding electrical coupler 910 comprise electrical connectors or inductive couplers. Electrical connectors and inductive couplers are well known in the art, and therefore will not be described in detail herein. Any known or to be known electrical connector or inductive coupler can be used herein without limitation. Still, it should be understood that, in some first scenarios, the electrical coupler 1100 comprises a plug connector configured to mate with a corresponding socket connecter 910 of another appliance 902. The plug and socket connectors can be of any type now known or to be known. In other second scenarios, the electrical coupler 1100 comprises an inductive coupler configured to be inductively coupled to an inductive coupler 910 of another appliance 902. In yet other third scenarios, a combination of electrical coupling and inductive coupling can be employed. For example, the electrical coupler 1100 of appliance 900 can comprise a plug connector configured to mate with a corresponding socket connecter 910 of another appliance 902. However, the electrical coupler 912 disposed on the bottom 908 of appliance 900 comprises an inductive coupler configured to inductively couple the appliance 900 with another appliance 904. As such, the electrical coupler 914 of appliance 904 includes an inductive coupler.

Similar to appliances 100, 600 described above, appliance 900 can be selected as a master unit or a slave unit. If the appliance 900 is selected as a slave unit, then it will be supplied power from another appliance 902 or 904 via electrical coupler 1100 or 912. In contrast, if the appliance 900 is selected as the master unit, then appliances 902, 904 constitute slave units. As such, appliances 902, 904 are supplied power from an electrical receptacle (e.g., a wall outlet) via the master unit 900. Accordingly, the appliance 900 comprises a plug connector 1006 coupled to a retractable cable 1008 shown in FIG. 10. Retractable cables are well known in the art, and therefore will not be described herein. Still, it should be understood that the cable 1008 can be stored in and removed from a chamber (not shown) formed within the base unit 1004. The plug-cable assembly may be the same as, similar to or different than that discussed above in relation to FIGS. 1-5. As such, the cable storage in and removal from a chamber (not shown) can be facilitated by a lever (e.g., lever 406 of FIG. 4) defining at least one sidewall of a channel in which the plug connector is disposed when in its engaged position.

Figure 12:
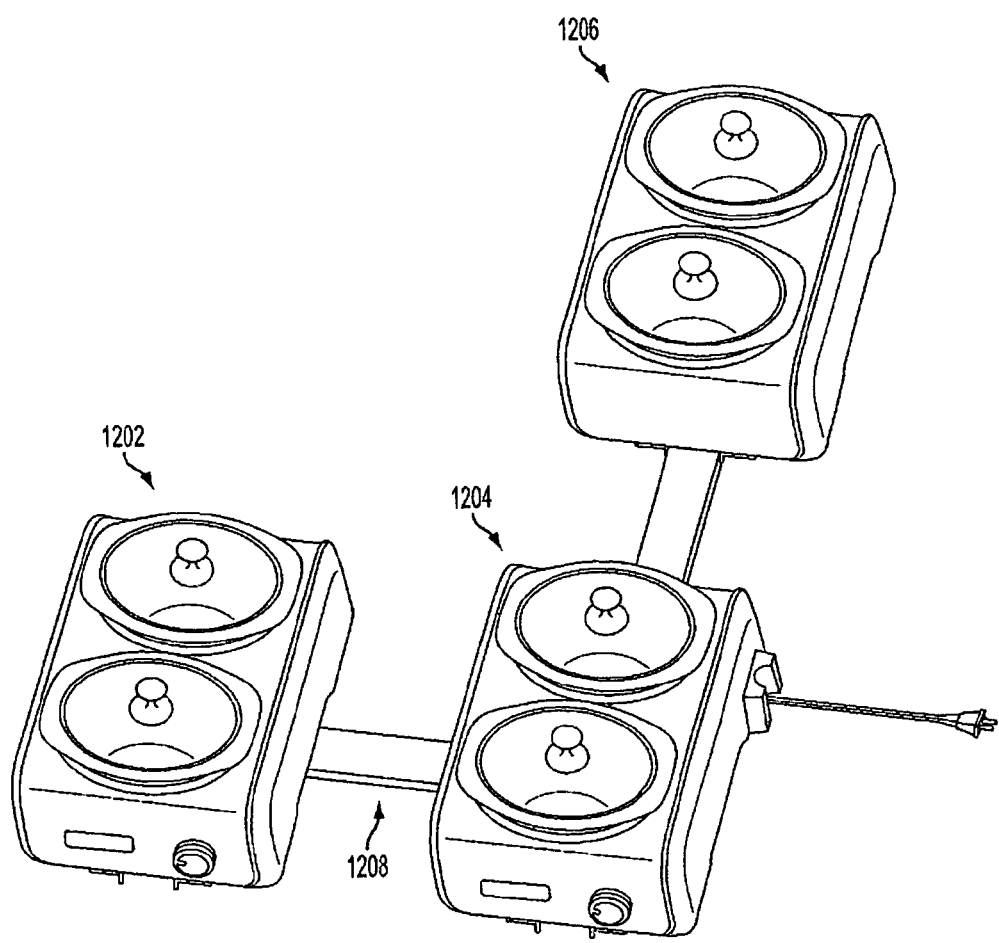
FIG. 12 is a top perspective view of three exemplary apparatus coupled together via a mechanical-electrical interconnect mechanism.
Figure 13:
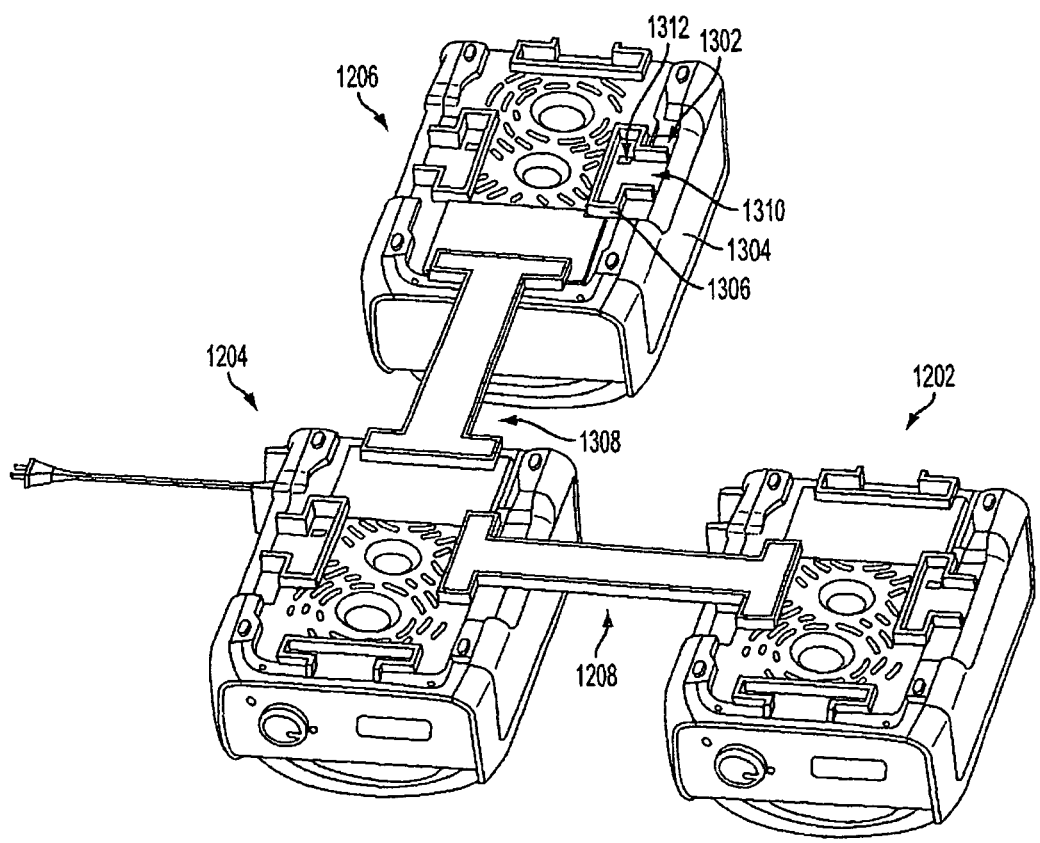
FIG. 13 is a bottom perspective view of three exemplary apparatus coupled together via a mechanical-electrical interconnect mechanism.

Referring now to FIGS. 12-13, there are provided schematic illustrations of exemplary appliances 1202, 1204, 1206 coupled together. Similar to appliance 100 described above, each of the appliances 1202, 1204, 1206 is designed to be electrically interconnected with at least one other appliance. However, the electrical interconnection is not achieved in the same manner as described above in relation to FIGS. 1-5. In this regard, the electrical interconnection is achieved via a bar interconnect 1208.

Figure 14:
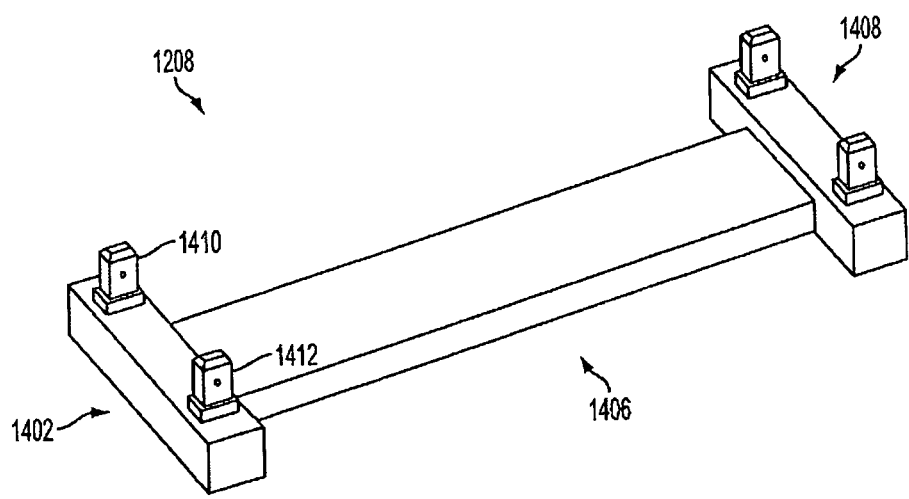
FIG. 14 is a perspective view of the mechanical-electrical interconnect mechanism of FIGS. 12 and 13.

As shown in FIG. 14, the bar interconnect 1208 has a generally "H" shape. The present invention is not limited in this regard. The bar interconnect 1208 can have any shape that is selected in accordance with a particular application. In the "H" shape scenario, the bar interconnect 1208 comprises two side bars 1402, 1408 and a central bar 1406. Each side bar 1402, 1408 has two electrical contacts 1410, 1412 disposed thereon. The electrical contacts 1410, 1412 facilitate the electrical coupling of two adjacent appliances 1202/1204 or 1204/1206, as shown in FIG. 12. In this regard, each appliance 1202, 1204, 1206 has an Electrical Coupling Assembly ("ECA") 1302 disposed on a bottom portion 1304 thereof for enabling said electrical coupling.

As shown in FIG. 13, the ECA 1302 comprises a sidewall 1306 having a geometric shape matching that of an end portion 1308 of the bar interconnect 1208. The sidewall 1306 defines an insert space 1310 for receiving the end portion 1308. The sidewall 1306 helps to ensure that the end portion 1308 will not become unintentionally decoupled from an appliance 1202, 1204, 1206 during use thereof. The sidewall 1306 also helps to ensure that the electrical contacts 1410, 1412 are properly aligned with corresponding electrical contacts 1312 during the electrical coupling process. The sidewall 1306 further helps to ensure that the electrical contacts 1410, 1412, 1312 remain mechanically and electrically coupled during use of the appliances 1202, 1204, 1206.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within, the spirit, scope and concept of the invention as defined.

We claim:

1. An appliance, comprising:
   a base unit;
   a first plug connector coupled to said base unit and configured to electrically couple said appliance to a first socket connector of an electrical receptacle;
   a channel formed on or in a first sidewall of said base unit in which said first plug connector is disposed when in an engaged position; and
   a lever defining as channel wall of said channel and being configured to facilitate a transition of said first plug connector between said engaged position and a disengaged position, wherein said lever engages said first plug connector when in said engaged position and does not engage said first plug connector when in said disengaged position.

2. The appliance according to claim 1, further comprising a retractable cable coupled to said first plug connector which may be removed from an internal chamber of said base unit when said first plug connector is in said disengaged position.

3. The appliance according to claim 1, wherein said lever and a plurality of channel walls of said channel collectively facilitate an alignment of said first plug connector and said first socket connector when being electrically coupled together.

4. The appliance according to claim 1, wherein said lever and a plurality of channel walls of said channel collectively facilitate a mechanical coupling of said base unit to said electrical receptacle.

5. The appliance according to claim 1, wherein said lever and a plurality of channel walls of said channel collectively facilitate:
 (a) an alignment of said first plug connector and said first socket connector when being electrically coupled together; and
 (b) a mechanical coupling of said base unit to said electrical receptacle.

6. The appliance according to claim 1, wherein said first plug connector comprises an aperture configured to receive a guide protruding out and away from said first socket connector.

7. The appliance according to claim 1, wherein the appliance is a cooking apparatus.

8. The appliance according to claim 1, further comprising a second socket connector configured to electrically couple said appliance to a second plug connector of another appliance, wherein said second socket connector is disposed on a first side of said base unit which is opposed from a second side on which said first plug connector is disposed.

9. The appliance according to claim 8, wherein said first plug connector and said second socket connector are aligned with each other.

10. The appliance according to claim 8, wherein at least one of said appliance and said another appliance is a cooking appliance.

11. An appliance, comprising:
 a base unit;
 a first inductive coupler configured to inductively couple said appliance to a first adjacent appliance;
 a retractable plug-cable assembly configured to electrically couple said appliance to an electrical receptacle;
 a channel formed on or in a first sidewall of said base unit in which a plug connector of said retractable plug-cable assembly is disposed when in an engaged position; and
 a lever defining a channel wall of said channel and being configured to facilitate a transition of said plug connector between said engaged position and a disengaged position, wherein said lever engages said plug connector when in said engaged position and does not engage said plug connector when in said disengaged position.

12. The appliance according to claim 11, wherein said appliance is exclusively supplied power from said electrical receptacle during a first period of time, and said appliance is exclusively supplied power from said first adjacent appliance during a second period of time.

13. The appliance according to claim 11, further comprising a second inductive coupler configured to inductively couple said appliance to a second adjacent appliance.

14. The appliance according to claim 11, wherein said appliance supplies power to said first adjacent appliance from said electrical receptacle via said first inductive coupler.

15. The appliance according to claim 14, wherein said second inductive coupler is disposed on a first side of said base unit opposed from a second side of said base unit on which said first inductive coupler is disposed.

16. The appliance according to claim 11, wherein said appliance is exclusively supplied power from said first adjacent appliance via said first inductive coupler.

17. The appliance according to claim 16, wherein said first inductive coupler is aligned horizontally with said second inductive coupler.

\* \* \* \* \*